(12) United States Patent
Ohba et al.

(10) Patent No.: US 7,999,843 B2
(45) Date of Patent: Aug. 16, 2011

(54) IMAGE PROCESSOR, IMAGE PROCESSING METHOD, RECORDING MEDIUM, COMPUTER PROGRAM, AND SEMICONDUCTOR DEVICE

(75) Inventors: Akio Ohba, Kanagawa (JP); Akira Suzuki, Tokyo (JP); Tomokazu Kake, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 828 days.

(21) Appl. No.: 10/587,172

(22) PCT Filed: Jan. 28, 2005

(86) PCT No.: PCT/JP2005/001629
§ 371 (c)(1),
(2), (4) Date: Jun. 11, 2007

(87) PCT Pub. No.: WO2005/078559
PCT Pub. Date: Aug. 25, 2005

(65) Prior Publication Data
US 2007/0279485 A1 Dec. 6, 2007

(30) Foreign Application Priority Data
Jan. 30, 2004 (JP) .................. 2004-023013

(51) Int. Cl.
*H04N 7/01* (2006.01)
*G06F 13/14* (2006.01)

(52) U.S. Cl. .......... 348/41; 345/519; 345/629; 345/156; 345/634; 345/638

(58) Field of Classification Search ...................... 348/41
See application file for complete search history.

(56) References Cited

U.S. PATENT DOCUMENTS

| 5,528,289 | A | * | 6/1996 | Cortjens et al. ............ 348/211.9 |
| 6,353,764 | B1 | * | 3/2002 | Imagawa et al. .................. 700/1 |
| 6,445,810 | B2 | * | 9/2002 | Darrell et al. ................. 382/115 |
| 6,771,277 | B2 | | 8/2004 | Ohba ............................ 345/629 |

(Continued)

FOREIGN PATENT DOCUMENTS
JP 08-263194 10/1996
(Continued)

OTHER PUBLICATIONS

English language Abstracts of JP2002-196855A, JP8-263194A & JP11.327753A.

(Continued)

*Primary Examiner* — Christopher S Kelley
*Assistant Examiner* — Hee-Yong Kim
(74) *Attorney, Agent, or Firm* — Matthew B. Dernier, Esq.; Gibson & Dernier LLP

(57) ABSTRACT

To provide an image processing technique for easy initial settings when a video image feature is used as an input interface.
This is an image processor having an image combining section 106 for combining a mirrored video image feature that includes an image of an operator as a portion thereof and an object image of an object that is associated with a predetermined event, to generate a combined image, and being adapted to provide production of the combined image on a display device. This image processor has a detection section 109 for detecting the position of an image of an operator included in the mirrored video image feature. The image combining section 106 is adapted to combine the object image and the mirrored video image feature in such a manner that the object image is displayed in a range that an image of a hand of the operator can reach, depending on the position of the image of the operator detected by the detection section 109.

20 Claims, 9 Drawing Sheets

U.S. PATENT DOCUMENTS

| | | |
|---|---|---|
| 7,200,247 B2 | 4/2007 | Ohba |
| 2002/0097247 A1* | 7/2002 | Ohba ............................ 345/501 |
| 2002/0126090 A1 | 9/2002 | Kirkpatrick et al. |
| 2003/0151628 A1* | 8/2003 | Salter ........................... 345/773 |
| 2004/0215689 A1* | 10/2004 | Dooley et al. ................. 709/200 |
| 2004/0240740 A1 | 12/2004 | Ohba |
| 2007/0110279 A1 | 5/2007 | Ohba |

FOREIGN PATENT DOCUMENTS

| | | |
|---|---|---|
| JP | 11-327753 | 11/1999 |
| JP | 2002-196855 | 7/2002 |
| JP | 2002196855 A | 7/2002 |
| JP | 2002196855 A5 | 4/2005 |
| WO | 9960522 A1 | 11/1999 |

OTHER PUBLICATIONS

International Search Report Dated Jun. 21, 2005.

Office Action for corresponding JP application 2006-197392, dated May 20, 2008.

Yasuhiro Machii, et al, "Motion Estimation Of The Hands And It's Application To Hummaninterface", Information Processing Society of Japan SIG Notes, vol. 91, No. 95, pp. 1-7, Nov. 14, 1991.

Office Action for corresponding JP application 2009-055982, dated Mar. 14, 2011.

Office Action for corresponding JP application 2006-197392, Appeal No. 2009-4811, dated Nov. 25, 2010.

Hiroshi Sasaki, et al, "Hand-Menu System: A Deviceless Virtual Input Interface for Wearable Computer", Transactions of The Virtual Reality Society of Japan, vol. 7, No. 3, pp. 393-401, Sep. 30, 2002.

Hiroshi Sasaki, et al, "Hand-Dial An Input Interface for Wearable Computer", Institute of Electronics, Information and Communication Engineers Technical Report, vol. 100, No. 565, pp. 77-84, Jan. 11, 2001.

Supplementary European Search Report for corresponding European Application No. 05704389.5, Jan. 19, 2011.

* cited by examiner

The present invention relates to an image processing technique with which captured images captured with an image capturing device such as a video camera are used as an input interface for commands for example.

BACKGROUND OF THE INVENTION

Keyboards, mouses, and controllers are examples of typical input devices for computers and video game machines. Operators enter a desired command that they want by using such an input device in order to work, for example, a computer so that it performs processing according to the command entered. The operators watch/listen, for example, images and sounds obtained as a result of the processing, through a display device or a speaker. Operators press many buttons on the input device and do other operations while looking at a cursor displayed on a display device, thereby to enter a command or commands.

In recent years, some techniques have been developed that allow command input by using a video image feature captured with an image capturing device such as a video camera, other than the methods that involve the conventional input device(s) as described above. The applicant of the present invention discloses, in Japanese Patent Laid-Open No. 2002-196855 (Title of the Invention: image processor, image processing method, recording medium, computer program, and semiconductor device), a technique with which a video image feature of an operator is acquired and the video image feature of the operator is combined with an object image that is accessed by the video image feature to produce the result on a predetermined display device. The object image is accessed by the moving video image feature, so that the video image feature itself functions as an input interface.

In order to use the video image feature as an input interface as described above, it is essential for correct and exact operations to adjust an angle of the image capturing device or select an angle of view in order to display an operator at an appropriate position. This often causes complicated and complex initial settings. Insufficient settings or inappropriate position of the operator can result in production of the video image feature of the operator at a position not easily accessible to the object image or can cause misrecognition, all of which may be an obstacle to the correct and exact input operations.

An object of the present invention is to provide an image processing technique with which initial settings can be made easily when a video image feature is used as an input interface, in which the technique is a solution for the problem as described above.

SUMMARY OF THE INVENTION

An image processor of the present invention that solves the aforementioned problem comprises object image generating means for generating an object image of an object that is associated with a predetermined event, and image combining means for superimposing said object image on top of a mirrored video image feature that includes an image of an operator as a portion thereof to generate a combined image, the image processor being adapted to provide production of the combined image on a predetermined display device, the image processor comprising detection means for detecting the position of the image of said operator included in said mirrored video image feature; said image combining means being adapted to combine said object image and said mirrored video image feature in such a manner that said object image is displayed in an area that an image of a hand of said operator can reach, depending on the position of the image of said operator detected by said detection means.

The object image is displayed in an area that the image of the hand of the operator can reach, depending on the position of the image of the operator, so that no object image is displayed at a position not accessible from the operator. This provides easier use of the video image feature as an input interface without any complicated initial settings.

The mirrored video image feature may be generated on the side of the image capturing device for capturing video image features. However, a general-purpose image capturing device may be used to obtain mirrored video image features when, for example, the image processor of the present invention further comprises image acquisition means for acquiring a video image feature that includes an image of said operator as a portion thereof captured with a predetermined image capturing device, from the image capturing device; and image reversing means that mirrors the acquired video image feature to generate said mirrored video image feature.

The area that the image of the hand of the operator can reach may be, for example around the position of the face of the operator. When an object image is displayed around the position of the face, for example, said detection means is adapted to detect the position of the face of the operator in the image of said operator, and said image combining means is adapted to combine said object image and said mirrored video image feature in such a manner that said object image is displayed in an area suitable to the detected position of the face. In such a case, said image combining means may be adapted to combine an image representing a marker that indicates that the operator has detected, at the position of the image of said operator detected by said detection means.

Said detection means may be adapted to detect the size of the image of said operator other than the position of the image of the operator. In such a case, said image combining means is adapted to combine said object image and said mirrored video image feature in such a manner that said object image is displayed with the size suitable to the detected image of said operator. As a result, the object image can be displayed with the size suitable to the image of the operator. There is no imbalance in displayed appearance of the images of the operator and of the object.

When the image processor further comprises means for generating a motion image map, the motion image map being obtained by layering images of difference that represent the difference in images between frames of said mirrored video image feature, said image combining means may be adapted to determine an area where said object image is to be combined, depending on the motion of the image of said operator determined on the basis of this motion image map.

In addition, when the image processor comprises means for detecting change in color of each area between frames of said mirrored video image feature, said image combining means may be adapted to determine an area where said object image is to be combined, depending on the motion of the image of said operator determined on the basis of the change in color.

When said mirrored video image feature contains images of multiple candidate operators who can be an operator, said detection means is adapted to detect the position of an image of a candidate operator for each of said multiple candidate operators, and said image combining means may be adapted to combine said object image and said mirrored video image feature in such a manner that said object image is displayed in a range that the images of the hands of the individual candidate operators can reach, depending on the positions of the images of said multiple candidate operators detected by said detection means.

In other words, the object image is superimposed at a position that allows access to the object image from the image of each candidate operator. For example, when there are two candidate operators, the object image is combined so that it is displayed between them.

When the operator is selected out of multiple candidate operators, a following configuration may be provided.

For example, the image processor comprises means for selecting, when said object image is accessed, the image of the candidate operator who has accessed the object image, as the image of said operator. The candidate operator who has accessed the object first is determined as the operator.

Alternatively, when said mirrored video image feature is a stereo image captured simultaneously from multiple different angles, the image processor comprises means for selecting the image of the candidate operator who is displayed at the position closest to said object image in each of the images making up of the stereo image, as the image of said operator. The candidate operator who is displayed at the position closest to the object image is determined as the operator.

Alternatively, said object image generating means may be adapted to generate multiple object images corresponding to the respective candidate operators, and said image combining means may be adapted to combine said multiple object images and said mirrored video image feature in such a manner that the respective object images are displayed in a range that the image of the hand of the candidate operator can reach, for each image of the candidate operator. In such a case, when either one of the multiple object images are accessed, the image of the candidate operator corresponding to the object image is selected as the image of said operator. The person who accesses the object image assigned to him or her is determined as the operator.

When an operator is selected out of the multiple candidate operators, said display control means may do zooming, panning and/or tilting the image of the selected candidate operator by digital processing or by controlling the image capturing device for capturing said mirrored video image feature, in order to provide clear distinction of the operator with the operator being allowed to be displayed larger at the center of the screen.

In addition, the present invention provides an image processing method as follows. This image processing method is to be carried out by an image processor comprising image combining means for generating a combined image including a mirrored video image feature that includes an image of an operator as a portion thereof and object image of an object that is associated with a predetermined event, and detection means for detecting the position of the image of said operator included in said mirrored video image feature, the image processor being adapted to provide production of the resulting combined image on a predetermined display device, in which said image combining means combines said object image and said mirrored video image feature in such a manner that said object image is displayed in a range that an image of a hand of said operator can reach, depending on the position of the image of said operator detected by said detection means.

The present invention also provides a computer program as follows. This computer program is a computer program with which a computer to which a display device is connected is directed to form: object image generating means for generating an object image of an object that is associated with a predetermined event; image combining means for superimposing said object image on top of a mirrored video image feature that includes an image of an operator as a portion thereof to generate a combined image; display control means for providing production of the resulting combined image on said display device; and detection means for detecting the position of the image of said operator included in said mirrored video image feature; and with which said image combining means is directed to provide a function of combining said object image and said mirrored video image feature in such a manner that said object image is displayed in a range that an image of a hand of said operator can reach, depending on the position of the image of said operator detected by said detection means.

The present invention also provides a semiconductor device as follows. This semiconductor device is integrated in a device mounted on a computer to which a display device is connected, thereby with the semiconductor device, said computer is directed to form: object image generating means for generating an object image of an object that is associated with a predetermined event; image combining means for superimposing said object image on top of a mirrored video image feature that includes an image of an operator as a portion thereof to generate a combined image; display control means for providing production of the resulting combined image on said display device; and detection means for detecting the position of the image of said operator included in said mirrored video image feature; and said image combining means is directed to provide a function of combining said object image and said mirrored video image feature in such a manner that said object image is displayed in a range that an image of a hand of said operator can reach, depending on the position of the image of said operator detected by said detection means.

As apparent from the aforementioned description, according to the present invention, initial settings can be made easily when a video image feature is used as an input interface.

BEST MODE FOR CARRYING OUT THE INVENTION

Now, an embodiment of the present invention is described in detail.

Figure 1:
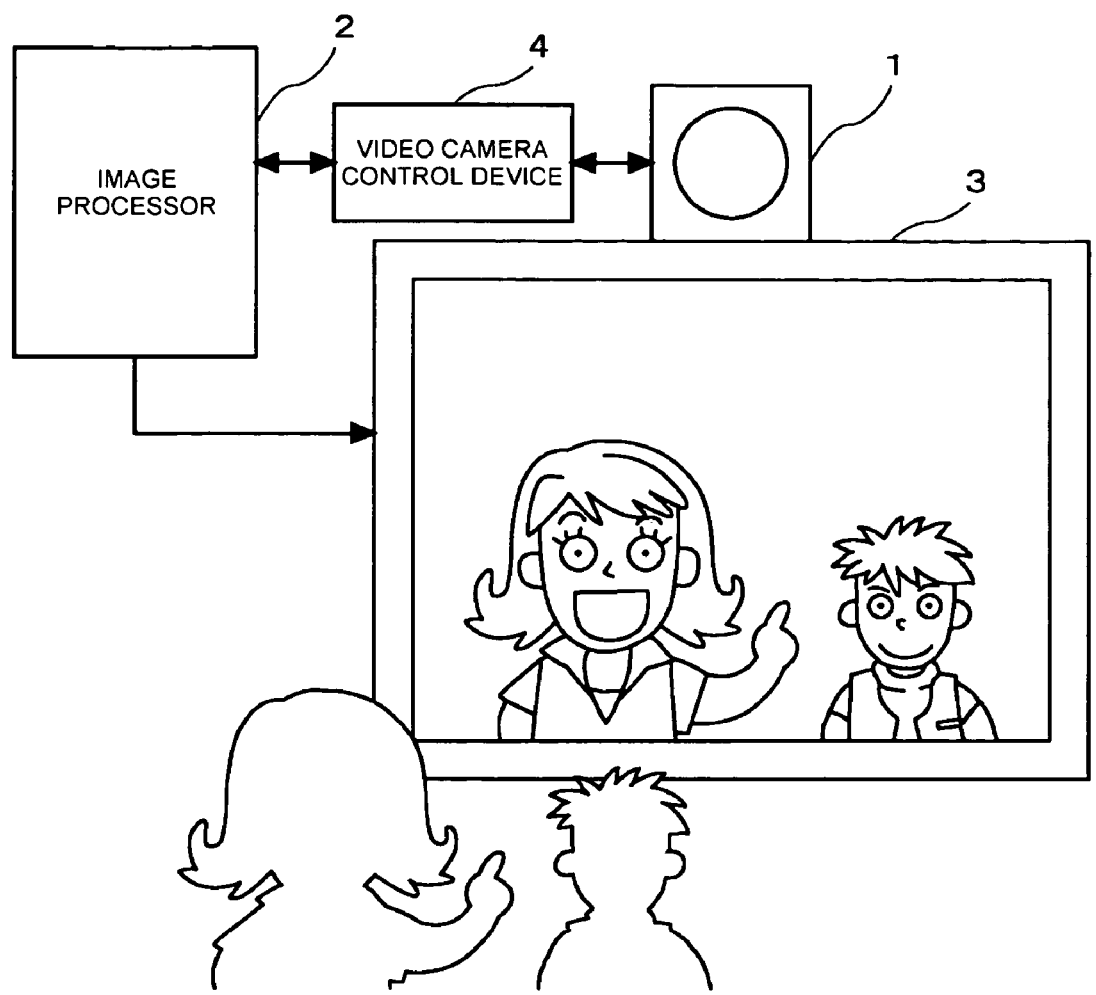
FIG. 1 is an entire configuration diagram of an image processing system to which the present invention is applied.

FIG. 1 is a view showing an example of a configuration of an image processing system to which the present invention is applied.

This image processing system comprises an analog or digital video camera 1 which is an example of an image capturing device, an image processor 2, a display device 3, and a video camera control device 4. The image processing system captures, with the video camera 1, pictures of a candidate operator facing against the display device 3, and continuously supplies the resulting video image features to the image processor 2 in time series to generate mirrored video image features as well as combines the mirrored video image features with an object image associated with an object such as a menu or a cursor to generate combined images (which also serve as video image features), to thereby achieve real-time production of the combined images on the display device 3. The object image is combined so that it is displayed in a certain range where the candidate operator in the mirrored video image feature can access.

An object is associated with a predetermined processing. When an object image is accessed by the operator selected out of the candidate operators, a corresponding processing (event) is performed accordingly.

The mirrored video image features may be generated by means of mirroring (interchanging the right and left sides of the image) the video image features received from the video camera 1, by the image processor 2. Alternatively, a mirror may be placed in front of the video camera 1 and the video image features on the mirror in which the candidate operator(s) is/are reflected may be captured to generate the mirrored video image features. Alternatively, the video camera 1 itself may have a function to generate mirrored video image features. In any way, a combined image of the mirrored video image features and the object image, of which display appearance changes in real time depending on the motion of the operator, is displayed on the display device 3.

The video camera control device for controlling the video camera 1 directs the video camera 1 to do zooming, panning, and tilting, in response to an instruction of the image processor 2. It may be contained within the video camera 1 or the image processor 2.

The image processor 2 is implemented by a computer that provides a desired function based on a computer program.

Figure 2:
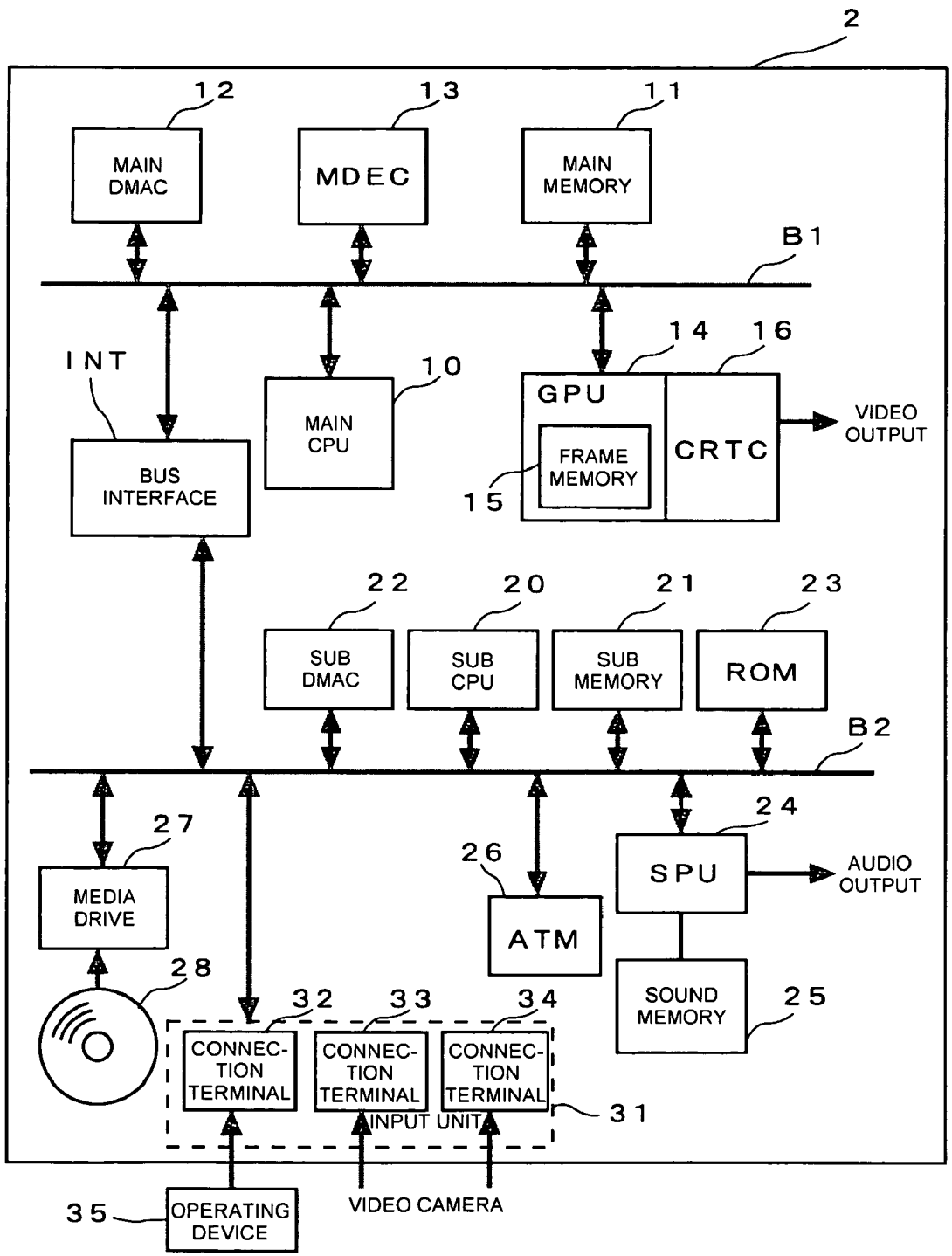
FIG. 2 is a configuration diagram of an image processor according to this embodiment.

The computer in this embodiment comprises two buses, a main bus B1 and a sub bus B2 to which multiple semiconductor devices each having their own functions are connected, as an exemplified hardware configuration thereof is shown in FIG. 2. These buses B1 and B2 can be connected to and separated from each other through a bus interface INT.

To the main bus B1 connected are a main CPU 10, which is a main semiconductor device, a main memory 11 formed of a RAM, a main DMAC (Direct Memory Access Controller) 12, an MPEG (Moving Picture Experts Group) decoder (MDEC) 13, and a graphic processing unit (Graphic Processing Unit, hereinafter "GPU") having therein a frame memory 15 which serves as a graphic memory. To the GPU 14 connected is a CRTC (CRT Controller) 16 that generates video signals which are used to allow production of the data rendered on the frame memory 15, on the display device 3.

The main CPU 10 loads a boot program through the bus interface INT from a ROM 23 on the sub bus B2 during the startup of the computer and starts executing the boot program to invoke the operating system. It controls the media drive 27, reads application programs and data from a medium 28 loaded in a media drive 27, and stores them in the main memory 11. Furthermore, it performs geometry processing (coordinates arithmetic processing) for various data read from the medium 28, such as 3D object data (coordinates of vertices (representative points) of each polygon) made up of several basic figures (polygons), to represent, for example, the shape and movement of the object. It then produces a display list containing geometry-processed polygon definition information (e.g., the shape and drawing position of a polygon to be used, and details of the type, color tone, and texture of a component or components forming the polygon).

The GPU 14 has drawing contexts (drawing data including components of a polygon) stored therein. It is a semiconductor device having functions of reading necessary drawing context according to the display list supplied from the main CPU 10 to perform rendering processing (drawing processing) and of drawing a polygon into the frame memory 15. The frame memory 15 may also be used as a texture memory. This means that the pixel images on the frame memory may be placed on the polygon to be drawn as textures.

The main DMAC 12 is a semiconductor device that controls the DMA transfer among the circuits on the main bus B1 and also controls the DMA transfer among the circuits on the sub bus B2 as well in accordance with the status of the bus interface INT. The MDEC 13 is a semiconductor device that operates in parallel with the main CPU 10 and decodes the data compressed in the MPEG (Moving Picture Experts Group) format or the JPEG (Joint Photographic Experts Group) format.

The sub bus B2 is connected to a sub CPU 20 formed of, for example, a microprocessor, a sub memory 21 formed of a RAM, a sub DMAC 22, a ROM 23 on which control programs such as the operating system are stored, a semiconductor device for sound processing (SPU (Sound Processing Unit)) 24 that is adapted to read sound data stored on the sound memory 25 to produce them as an audio output, an communication control section (ATM) 26 for sending and receiving information to and from external devices through a network which is not shown, a media drive 27 into which a medium 28 such as a CD-ROM or a DVD-ROM can be inserted, and an input unit 31.

The sub CPU 20 carries out various operations in accordance with the control programs stored in the ROM 23. The sub DMAC 22 is a semiconductor device that provides control such as the DMA transfer among the circuits on the sub bus B2 only when the bus interface INT separates the main bus B1 and the sub bus B2. The input unit 31 has a connection terminal 32 through which input signals from an operating device 35 are received, a connection terminal 33 through which image signals from the video camera 1 are received, and a connection terminal 34 through which audio signals from the video camera 1 are received.

The present specification describes only about images and not about sounds for simplification purposes.

Figure 3:
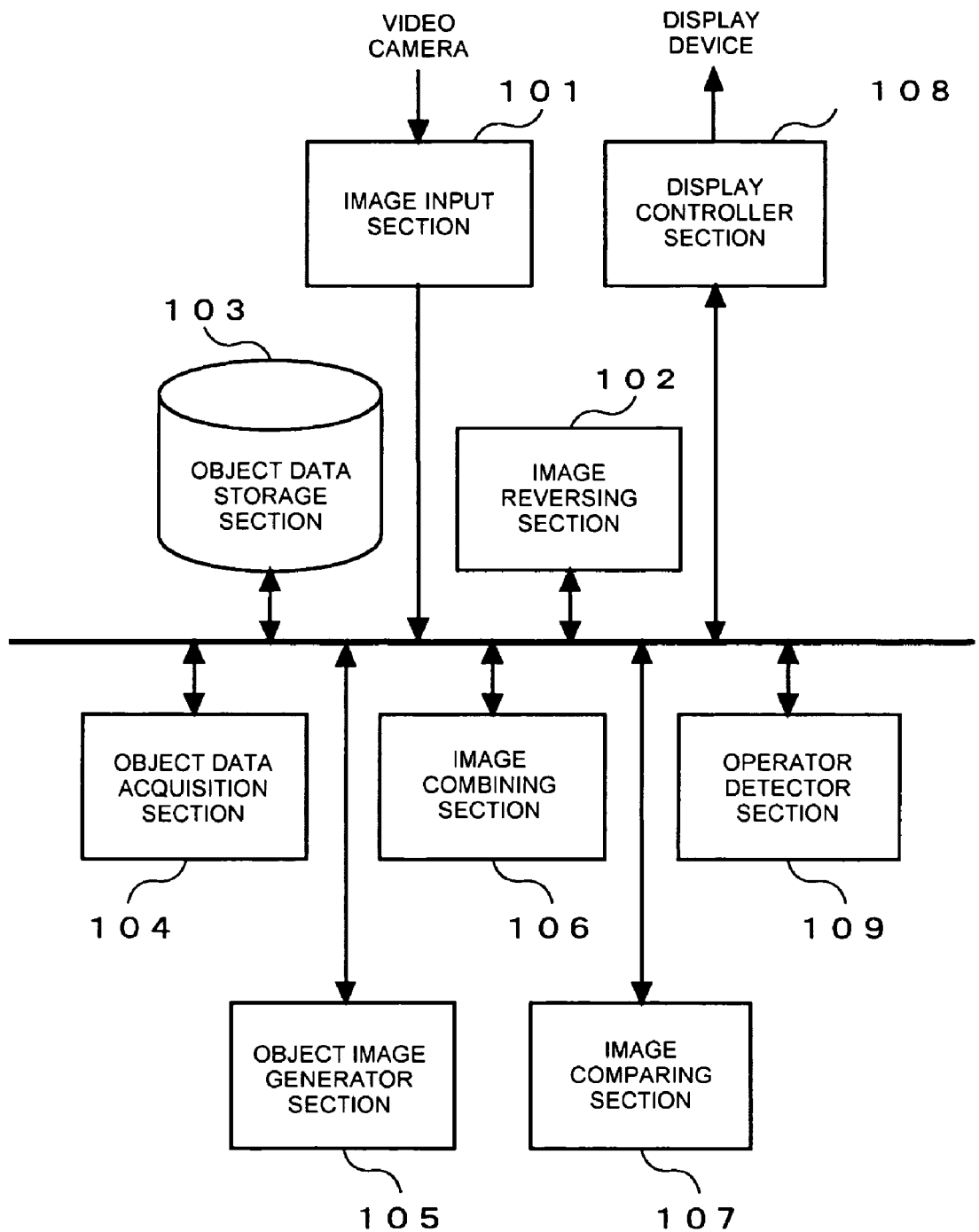
FIG. 3 is a functional block diagram of an image processor of this embodiment.

In the computer having the above-mentioned configuration, the main CPU 10, the sub CPU 20 and the GPU 14 read and execute a desired computer program out of the recording medium such as the ROM 23 and the medium 28 to form functional blocks that are necessary for serving as the image processor 2, i.e., an image input section 101, an image reversing section 102, an object data storage section 103, an object data acquisition section 104, an object image generator section 105, an image combining section 106, an image comparing section 107, a display controller section 108, and an operator detector section 109 as shown in FIG. 3.

In the relationship with the hardware shown in FIG. 2, the image input section 101 is formed of the input unit 31 and the sub CPU 20 that controls the operation thereof. The image reversing section 102, the object data acquisition section 104, the object image generator section 105, the image comparing section 107, and the operator detector section 109 are formed of the main CPU 10. The image combining section 106 is formed of the GPU 14. The display controller section 108 is formed of the GPU 14 and the CRTC 16 that are cooperating with each other. The object data storage section 103 is formed in a memory area such as the main memory 11 accessible from the main CPU 10.

The image input section 101 receives captured images captured with the video camera 1 via the connection terminal 33 of the input unit 31. In the case where the incoming captured image is a digital image it receives the image as is. In the case where the incoming captured image is an analog image, it receives the image after A/D conversion thereof into a digital image.

The image reversing section 102 performs mirroring processing, that is, interchanging the right and left sides of the captured image received by the image input section 101, to form a mirrored video image feature. It should be noted that no image reversing section 102 is required when a captured image received by the image processor 2 is a mirrored video image feature because a mirror is placed in front of the video camera 1 for the picture capturing with the video camera 1 or because the video camera 1 has a function of generating a mirrored image.

The object data storage section 103 holds object data together with identification data thereof, the object data being for representing an object image such as a menu image (including a submenu) and a cursor image.

The object data acquisition section 104 receives object data from the object data storage section 103 and sends them to the object image generator section 105.

The object image generator section 105 generates an object image according to the object data received from the object data acquisition section 104. The object image generator section 105 determines a state of representation of the object based on the program or the operation by the operator and generates an object image to provide the state of representation.

The image combining section 106 draws a combined image in the frame memory 15, the combined image being obtained by combining the mirrored video image feature with the object image generated by the object image generator section 105. It should be noted that an object image may be displayed on a mirrored video image feature by means of known imposing technique rather than combining the object image to create a combined image.

The image comparing section 107 compares, on a frame by frame basis, the mirrored video image features and generates an image representing a difference between the mirrored video image features of the preceding and following frames. Furthermore, the image comparing section 107 compares, on a frame by frame basis, the mirrored video image features to detect any change in color in individual areas in the mirrored video image features between frames.

The image representing the difference is an image that represents a variation per frame of the motion of an operator (or a candidate operator) included in the mirrored video image features. For example, it is an image corresponding to a difference between an image of the operator (or the candidate operator) before movement and another image of the operator (or the candidate operator) after the movement when the operator (or the candidate operator) has moved in the mirrored video image features. Superimposing some images representing the difference demonstrates the range and frequency of movements of the operator (or the candidate operator). This frequency may be used to determine at which position the object image is to be displayed.

Detection of change in color of the individual areas in the mirrored video image features indicates that the operator (or the candidate operator) has moved. For example, when someone shades his or her clothes with his or her hand, the color of the area shaded with the hand changes from the color of the clothes to the color of the hand on the screen. This change in color shows that the hand is placed in front of the clothes.

The frequency of movements of the operator (or the candidate operator) and the change in color are factors to determine to which area in the mirrored video image feature the object image should be combined.

The operator detector section 109 is for detecting, for example, the position and the size of the face of the candidate operator in the mirrored video image feature. For example, a known face sensing technique is used to detect, for example, the position and the size of the face of the candidate operator. Examples of the face sensing technique that can be used include a support vector machine (SVM), boosting (boosting), neural network, and eigenface technique (Eigen Face). The operator detector section 109 is for selecting a single operator from a plurality of candidate operators. The choice of the operator is determined when, for example, the candidate operator accesses an object image such as a menu image.

The display controller section 108 converts the combined image generated by the image combining section 106 to a video signal and supplies it to the display device 3. In addition, the display controller section 108 is for zooming, panning, and tilting on the operator selected by the operator detector section 109. The zooming, panning, and tilting operations may be done by digital processing of the image drawn in the frame memory. Alternatively, zooming, panning, and tilting of the video camera 1 may be done by the video camera control device 4.

The display device 3 displays the combined images (video image features) on a screen using this video signal supplied from the display controller section 108.

<Image Processing Method>

Next, examples of the image processing method that is carried out by the image processing system as described above are described.

EXAMPLE 1

Figure 4:
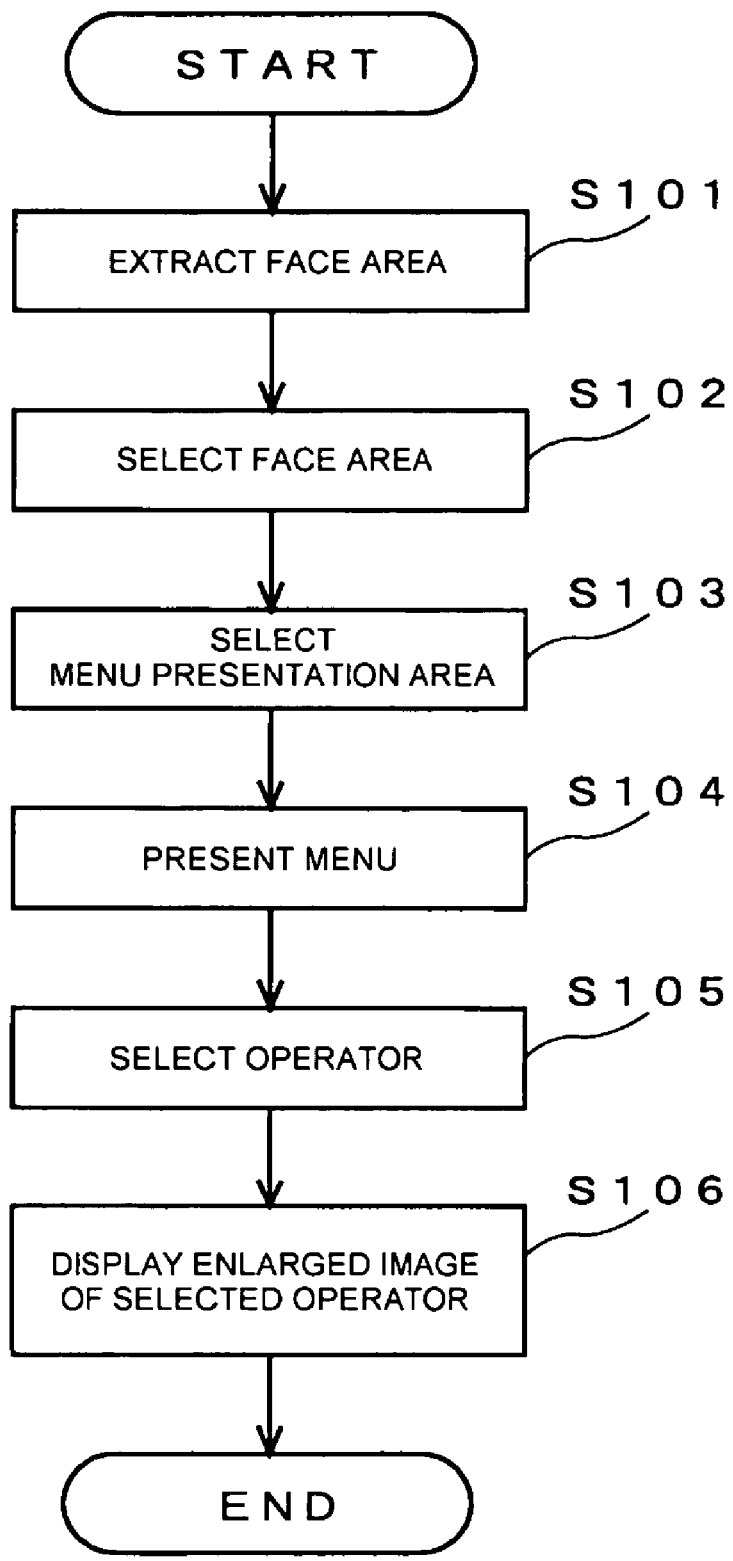
FIG. 4 is a flow chart illustrating a processing procedure of this embodiment.

FIG. 4 is a flow chart illustrating a procedure of the image processing method according to the present invention where the aforementioned image processing system is used.

It is assumed that a mirrored video image feature including two candidate operators is produced on the display device 3, as shown in FIG. 1. For the purpose of clarifying the description, the number of the candidate operators produced on the display device 3 is two, but the number may be more, or only one. When there is only one candidate operator, he or she is specified as the operator.

The mirrored video image feature is generated by supplying a video image feature captured by the video camera 1 to the image processor 2 and interchanging the right and left sides of the image by the image reversing section 102. The image of which right and left sides have been interchanged is produced on the display device, which results in the production of the mirrored video image feature as shown in FIG. 1.

Figure 5:
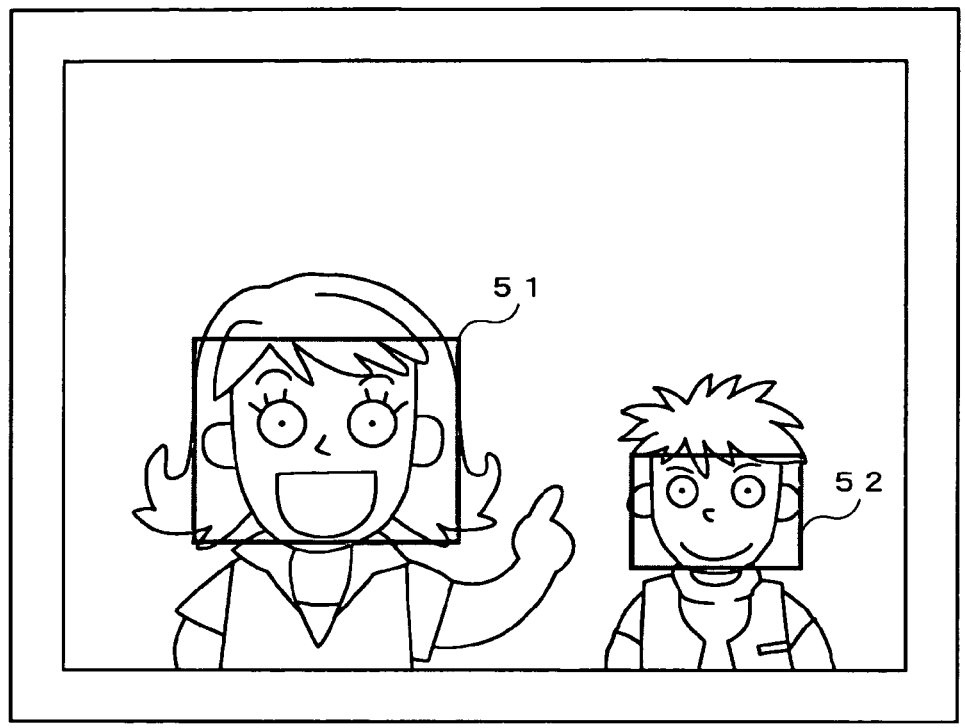
FIG. 5 is a view showing an example of a mirrored video image feature with which marker images have been combined.

The image processor 2 detects, by the operator detector section 109, the position of the face of the candidate operator in the mirrored video image feature by using a face sensing technique and encloses the detected positions with rectangular marker images 51 and 52 (step S101). The marker images 51 and 52 are also a kind of object images. The image combining section 106 obtains the object images of the marker images 51 and 52 from the object data storage section 103 through the object image generator section 105 and the object data acquisition section 104 when the operator detector section 109 detects the position of the face of the candidate operator, and then combines them with the corresponding positions in the mirrored video image feature. The display controller section 108 directs the display device 3 to produce thereon the mirrored video image feature with which the marker images 51 and 52 have been combined (FIG. 5).

Figure 6:
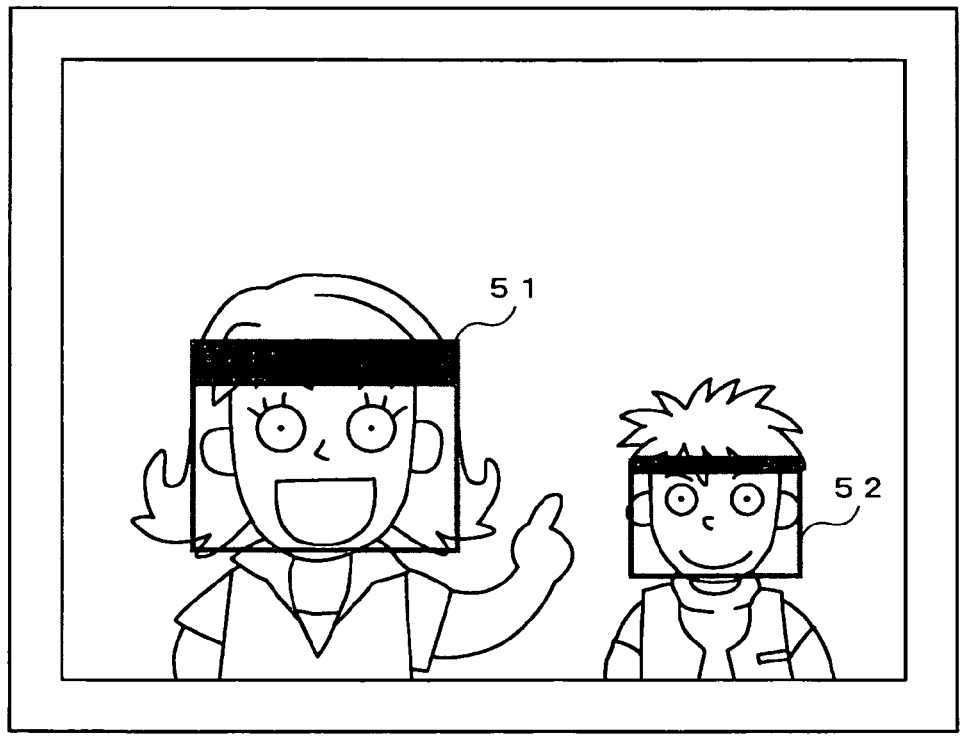
FIG. 6 is a view showing an example of a mirrored video image feature with which strip-like marker images have been combined.

Each of the marker images 51 and 52 may have a shape of a strip as shown in FIG. 6 rather than a rectangle, in which case the candidate operator is shown as wearing a hair band.

Figure 7:
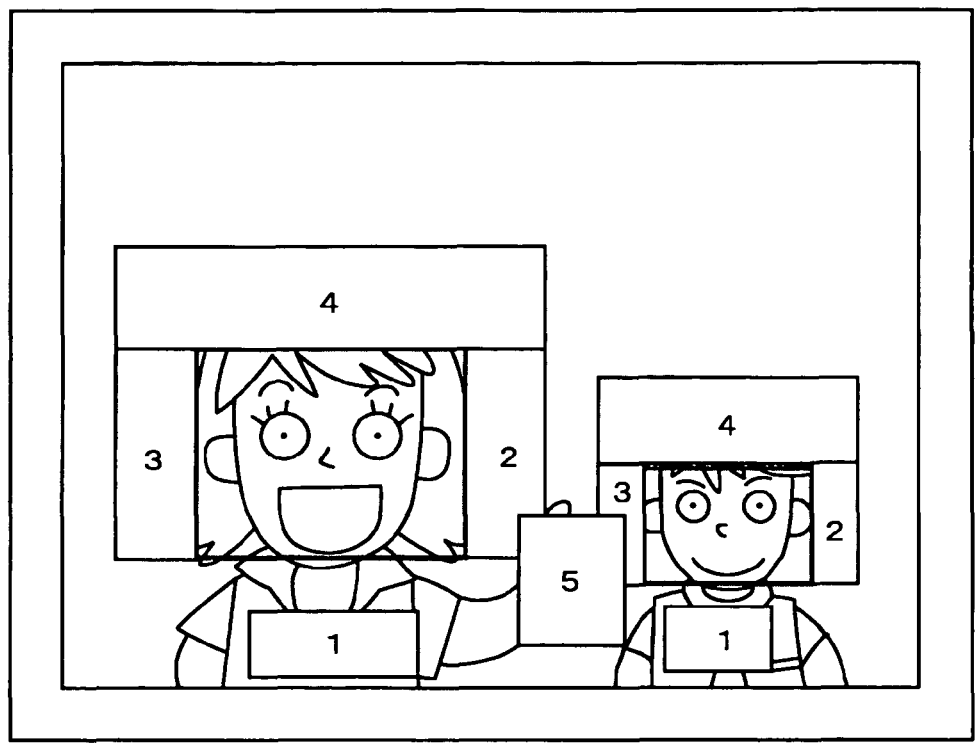
FIG. 7 is a view showing an example of a candidate presentation area for a menu image.

Subsequently, the operator detector section 109 selects an area of the face of the candidate operator in the mirrored video image feature based on the marker images 51 and 52 (step S102). Selection of the area of the face consequently determines a candidate presentation area for the menu image as shown in FIG. 7. In the example shown in FIG. 7, the candidate presentation area for the menu image is previously determined near the area of the face. The figure illustrated in the candidate presentation area represents the priority of presentation of the menu image. The candidate area below the area of the face (near the chest) has a priority "1". The candidate area near the right side of the area of the face has a priority "2", which is an area that can be accessed with the right hand. The candidate area near the left side of the area of the face has a priority "3", which is an area that can be accessed with the left hand. The candidate area above the area of the face has a priority "4", which is an area that can be accessed with either the right or left hand. The candidate area between the two areas of the face has a priority "5", which is an area that can be accessed by both candidate operators.

The individual candidate presentation areas may have the same size for all candidate operators depending on the priority. However, in FIG. 7, they have different sizes for each candidate operators. In FIG. 7, the left candidate operator is larger than the right candidate operator on the screen, so that the candidate presentation area for the left candidate operator is larger than the candidate presentation area for the right candidate operator. This means that the size of the candidate presentation area is changed depending on the size of the area of the face of the candidate operator. The size of the candidate operator may be determined by detecting the size of the face by the operator detector section 109.

The image combining section 106 selects the area where the menu image is actually presented from the candidate presentation areas for the menu image (step S103). The presentation area may be selected depending on, for example, the frequency of movements of the candidate operators in each portion of the mirrored video image feature or the change in color of the areas in the mirrored video image feature, which are detected by the image comparing section 107. The area where the candidate operator can be accessed most easily is selected according to the frequency of movements of the candidate operator and/or the change in color, from the candidate presentation areas. This area corresponds to the area where the menu image is presented.

Figure 8:
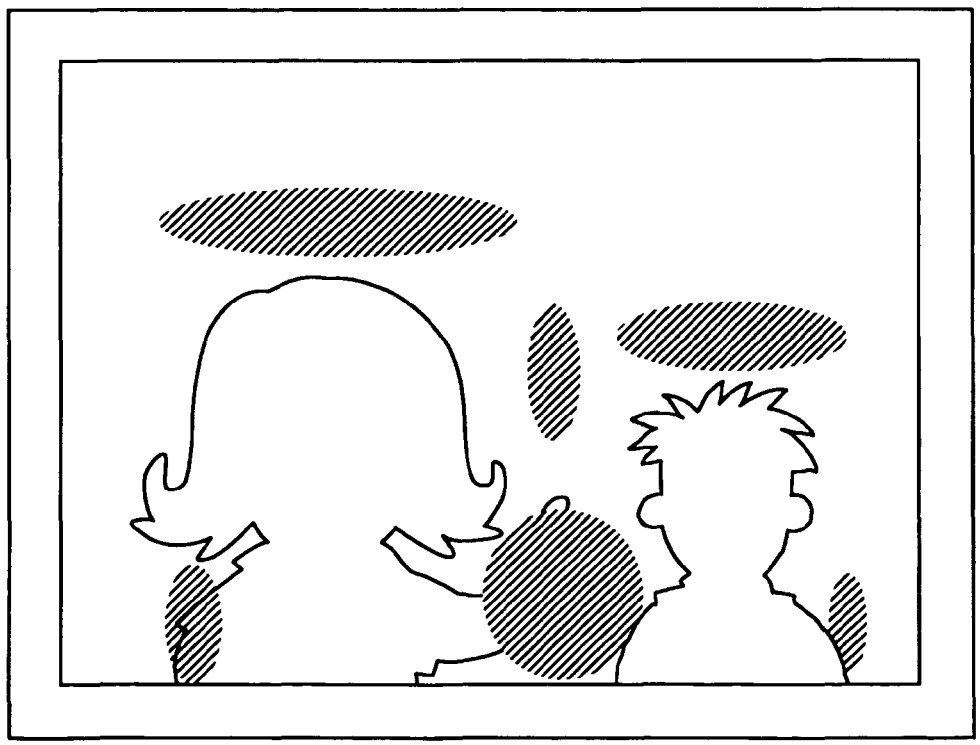
FIG. 8 is a view showing an example of a motion image map.

As described above, the frequency of movements of the candidate operator can be detected by superimposing the images representing the difference. FIG. 8 is a view showing an example of a motion image map obtained by superimposing the images representing the difference. Such a motion image map differentiates the area(s) where the frequency of movements of the candidate operator is large and small. In the example shown in FIG. 8, the area where the hand moves frequently is represented with a diagonal hatching as an area where the movement occurs frequently.

Figure 9:
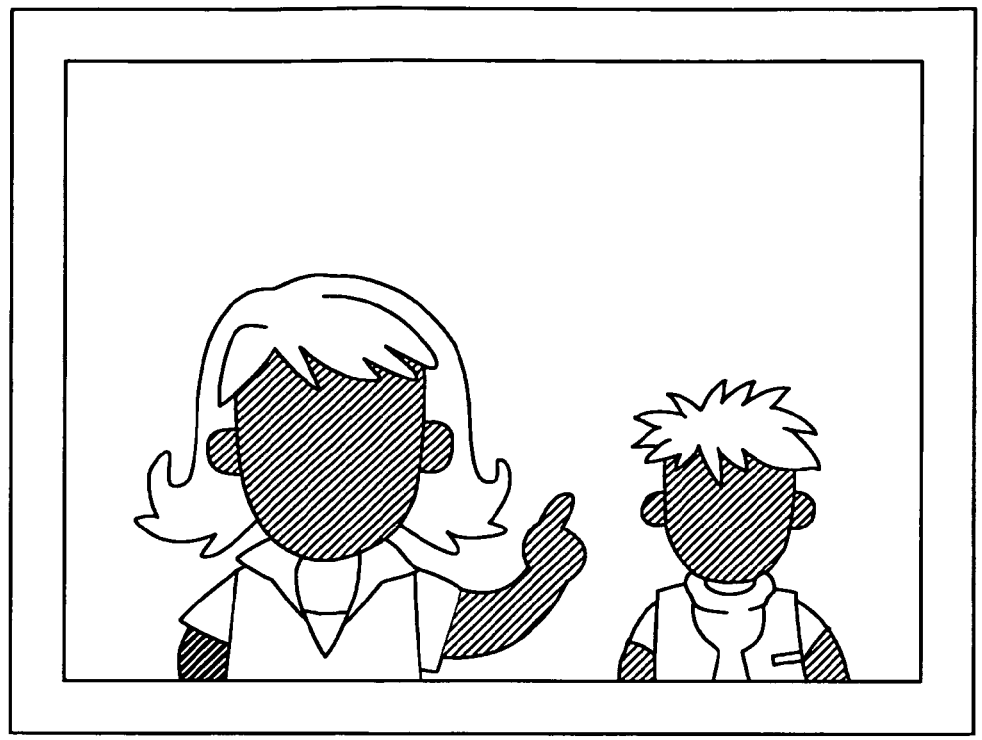
FIG. 9 is a view showing an example of a color area map.

The change in color may be found by using a color area map as shown in FIG. 9. The color area map shown in FIG. 9 represents the areas occupied with the same color as the color of the face is indicated with a diagonal hatching. By detecting the same color as the color of the face in an area other than the diagonal hatching area, the movement of the candidate operator can be detected. The color area map may be generated by means of, for example, detecting the color of the face when the position of the operator's face is detected using the face sensing technique and then detecting the areas having similar colors to the color of the detected face in the mirrored video image feature.

Figure 10:
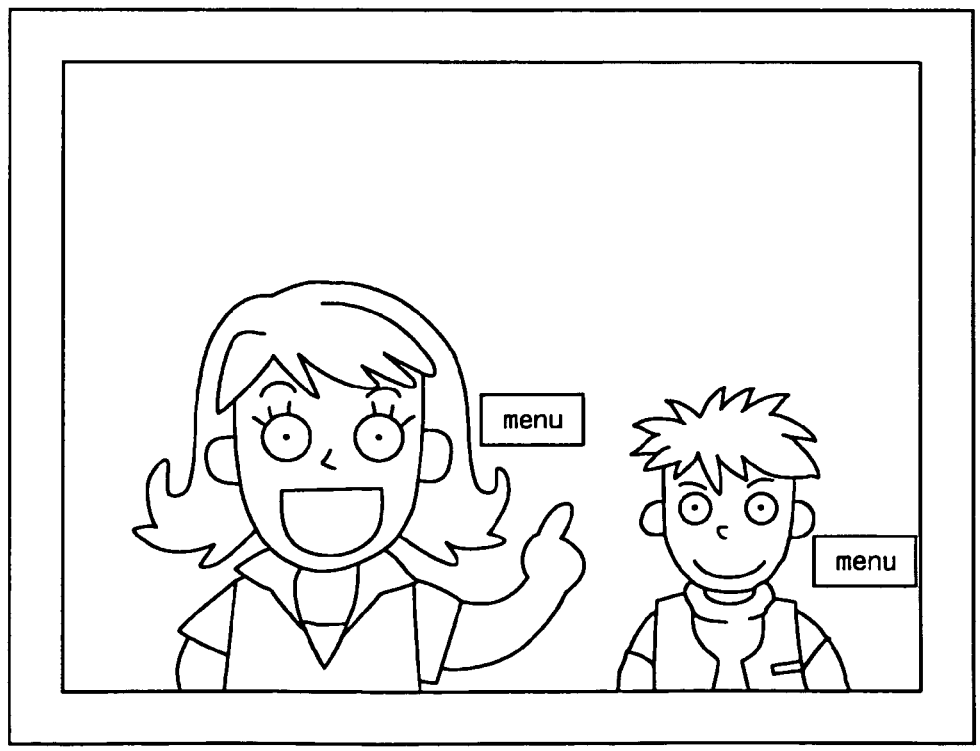
FIG. 10 is a view showing an example of a combined image that is obtained when a menu image is presented.

When the presentation area for the menu image is selected, the image combination section 106 generates a combined image which is a combination result of the mirrored video image feature and the menu image. The display controller section 108 directs the display device 3 to produce the resulting combined image (step S104). FIG. 10 is a view showing an example of an image produced on the display device 3 when the menu image is presented. In this example, the menu image is presented in the areas having the priority "2" near the faces of the two candidate operators.

In FIG. 10, the two menu images have the same size. However, they may have different presentation sizes for individual candidate operators. For example, the size of the menu images may be varied depending on the size of the candidate operators projected on the display device 3. The candidate presentation area for the candidate operator who is projected in a larger size is larger, so that the presentation area selected out of the candidate presentation areas is also larger for the candidate operator who is projected in a larger size. When the menu image is presented according to the size of the presentation area, the larger menu image can be presented for the candidate operator who is projected larger.

When one of the two candidate operators moves his or her hand and the hand of the candidate operator touches the menu image or accesses it on the combined image, the operator detector section 109 selects the candidate operator as the operator (step S105). This determines the operator who actually performs the operation.

Figure 11:
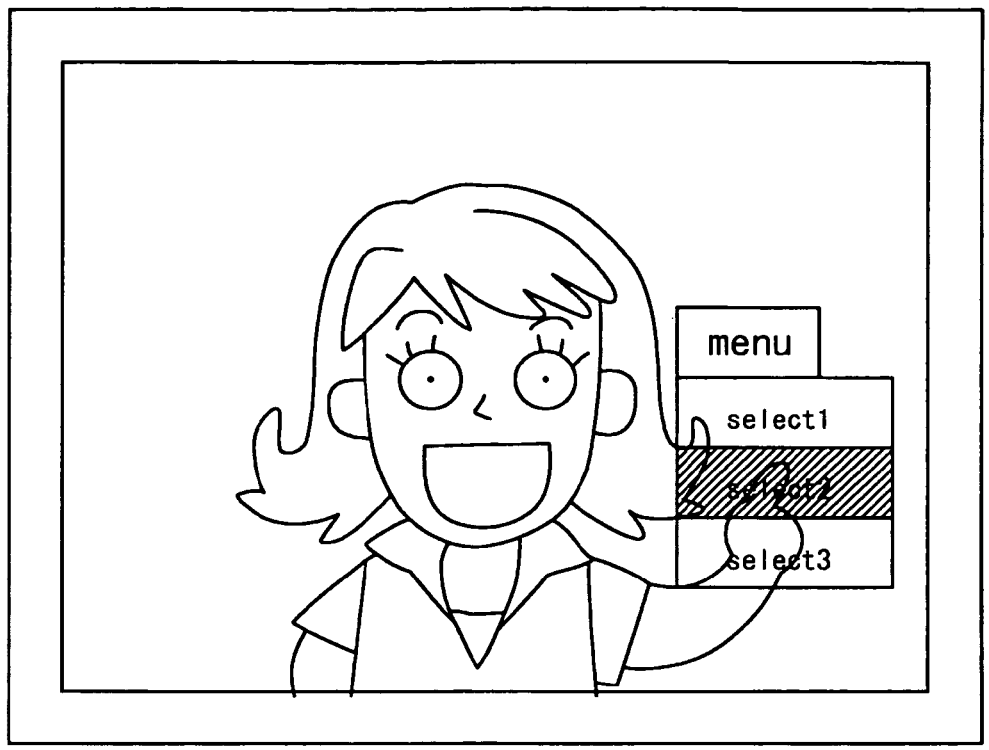
FIG. 11 is a view showing an example of a combined image that is obtained when an operator is determined.

When the operator who actually performs the operation is determined, the display controller section 108 enlarges the selected operator and produces him or her at the center of the screen, as shown in FIG. 11 (step S106). In addition, the menu image is accessed by the operator so that a pull-down image highlighting one of "select1", "select2" or "select3" at the lower layer is displayed.

In this way, the menu image can be displayed near the candidate operator, which eliminates complicated initial settings for operation. In addition, the operator who actually performs the operation can easily be selected out of two or more candidate operators.

EXAMPLE 2

Figure 12:
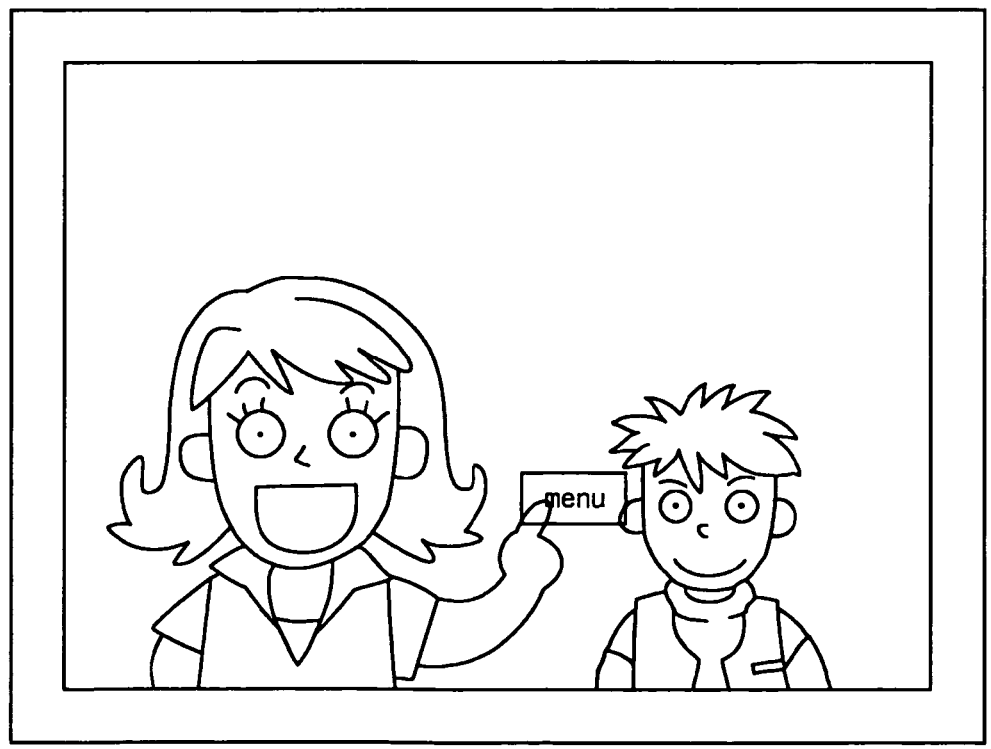
FIG. 12 is a view showing an example of a right eye image component for a stereo image.
Figure 13:
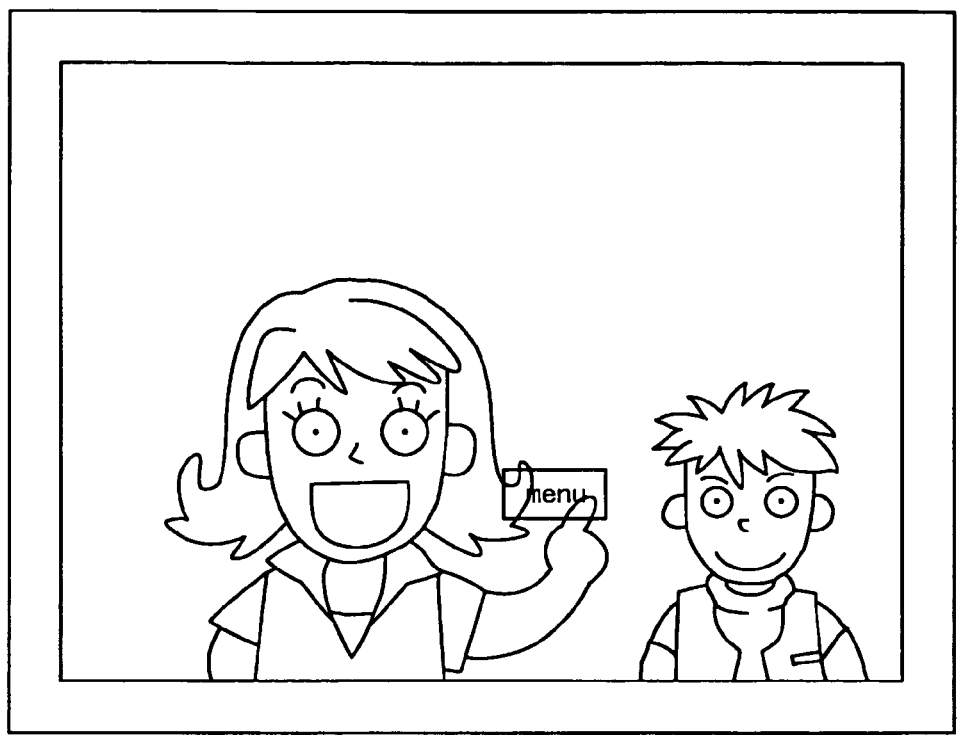
FIG. 13 is a view showing an example of a left eye image component for a stereo image.

In the Example 1, the candidate operator who accesses the menu image earlier is selected as the operator who actually performs the operation. However, the operator who actually performs operation may be selected by using a stereo-matching technique as described below. In the Example 2, two sets of mirrored video image features are provided by means of, for example, preparing two video cameras 1. FIGS. 12 and 13 are views showing an example of combined images in which a menu image is superimposed on top of two mirrored video image features.

Two mirrored video image features are, for example, stereo images for right and left eyes. In the example shown in FIGS. 12 and 13, FIG. 12 shows a right eye image component while FIG. 13 shows a left eye image component. The operator detector section 109 compares these two combined images and selects the candidate operator who is closer to the menu image as the operator. In the example shown in FIGS. 12 and 13, the candidate operator on the left side is closer to the menu image in both cases, so the left one is determined as the operator who actually performs the operation.

As described above, in both Examples, the menu image can easily be displayed in an area accessible from the operator (or the candidate operator). This eliminates complex initial settings which otherwise are necessary for input interfaces using mirrored video image features. In addition, an appropriate one person can be selected out of the multiple candidate operators. The initial settings do not complicated and two or more operators do not enter something even when two or more persons are displayed in a mirrored video image feature.

An area in which an object image other than the menu image is displayed can be determined by using a motion image map as shown in FIG. 8 or a color area map as shown in FIG. 9.

As described above, these maps can quantitatively represent the motion of an operator. The motion image map can represent areas with much motion, less motion, and no motion of an operator. An area with a large number of images representing the difference corresponds to an area with much motion of the operator. An area with a small number of images representing the difference corresponds to an area with less motion of the operator. An area with no image representing the difference corresponds to an area with no motion of the operator.

The color area map can represent the motion of an operator by using change in color. For example, an area of which color has changed can be found by means of comparing the color of the areas on the screen provided one frame earlier and the color of the areas on the screen provided currently. Change in color into a quite different color indicates that the operator has moved.

Figure 14:
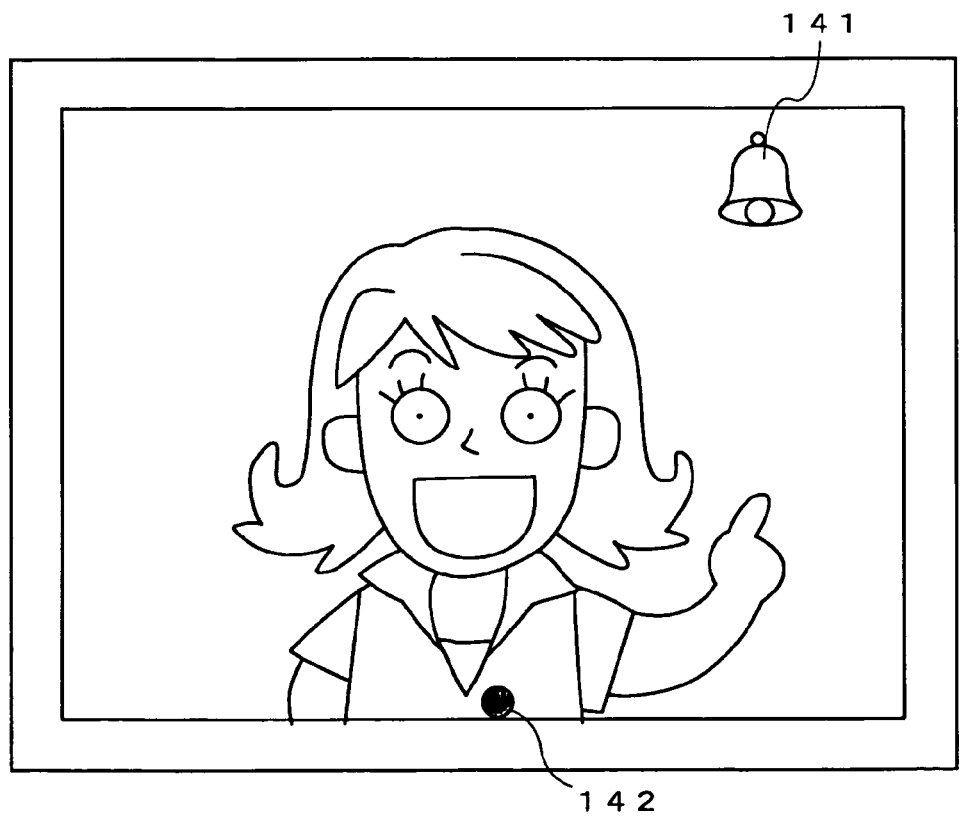
FIG. 14 is a view showing an example where an object image is displayed depending on the motion of the operator.

FIG. 14 is a view showing an example where an object image is displayed depending on the motion of the operator.

In FIG. 14, a bell image 141 and a button image 142 are displayed in addition to the operator. When the operator touches the bell image 141, an event such as ringing a bell occurs. When the operator touches the button image 142, an event associated with the button image occurs.

The bell image 141 is displayed in an area with less frequency of motion of the operator. The motion image map indicates the frequency of motion of the operator. Therefore, the image combining section 106 selects an area with less frequency according to this and generates a combined image so that the bell image 141 is displayed in that area.

The button image 142 is displayed in an area of which color has changed significantly. Since the color area map serves to detect change in color, the image combining section 106 uses it to select an area of which color has changed significantly and generates a combined image in such a manner that the button image 142 is displayed in that area.

In this way, the object image can easily be placed depending on the motion of the operator.

The invention claimed is

1. An image processor comprising:
    object image generating means for generating an object image of an object that is associated with a predetermined event,
    image combining means for superimposing said object image on top of a mirrored video image feature that includes an image of an operator as a portion thereof to generate a combined image, the image processor being adapted to provide production of the combined image on a predetermined display device,
    detection means for detecting the position of the image of said operator included in said mirrored video image feature wherein said image combining means being adapted to combine said object image and said mirrored video image feature in such a manner that said object image is displayed in an area that an image of a hand of said operator can reach, depending on the position of the image of said operator detected by said detection means, and
    means for generating a motion image map, the motion image map representing areas with high frequency and less frequency of motion of the operator and being obtained by layering images of difference that represent the differences in images between frames of said mirrored video image feature,
    said image combining means being adapted to determine an area where said object image is to be combined, depending on a range and frequency of the motion of the image of said operator as determined on from the motion image map.

2. The image processor as claimed in claim 1 further comprising:
    image acquisition means for acquiring a video image feature that includes an image of said operator as a portion thereof captured with a predetermined image capturing device, from the image capturing device; and
    image reversing means that mirrors the acquired video image feature to generate said mirrored video image feature.

3. The image processor as claimed in claim 1 wherein said detection means is adapted to detect the position of the face of the operator in the image of said operator, and said image combining means is adapted to combine said object image and said mirrored video image feature in such a manner that said object image is displayed in an area suitable to the detected position of the face.

4. The image processor as claimed in claim 1, wherein said detection means is further adapted to detect the size of the image of said operator, and said image combining means is adapted to combine said object image and said mirrored video image feature in such a manner that said object image is displayed with the size suitable to the detected image of said operator.

5. The image processor as claimed in claim 1, wherein said image combining means is adapted to combine an image representing a marker that indicates that the operator has been detected, at the position of the image of said operator detected by said detection means.

6. The image processor as claimed in claim 1 comprising means for detecting change in color of each area between frames of said mirrored video image feature, said image combining means being adapted to determine an area where said object image is to be combined, depending on the motion of the image of said operator determined on the basis of the change in color.

7. The image processor as claimed in claim 1, wherein, when said mirrored video image feature contains images of multiple candidate operators who can be an operator, said detection means is adapted to detect the position of an image of a candidate operator for each of said multiple candidate operators, and said image combining means is adapted to combine said object image and said mirrored video image feature in such a manner that said object image is displayed in a range that the images of the hands of the individual candidate operators can reach, depending on the positions of the images of said multiple candidate operators detected by said detection means.

8. The image processor as claimed in claim 7 further comprising means for selecting, when said object image is accessed, the image of the candidate operator who has accessed the object image, as the image of said operator, and display control means for zooming, panning or tilting the image of the selected candidate operator.

9. The image processor as claimed in claim 8 wherein said display control means is adapted to do zooming, panning and/or tilting of the image of the selected candidate operator by digital processing.

10. The image processor as claimed in claim 8 wherein said display control means is adapted to do zooming, panning or tilting of the image of the selected candidate operator by controlling the image capturing device for capturing said mirrored video image feature.

11. The image processor as claimed in claim 7 further comprising means for selecting, when said mirrored video image feature is a stereo image captured simultaneously from multiple different angles, the image of the candidate operator who is displayed at the position closest to said object image in each of the images making up of the stereo image, as the image of said operator, and display control means for zooming, panning or tilting the image of the selected candidate operator.

12. The image processor as claimed in claim 11, wherein said display control means is adapted to do zooming, panning or tilting of the image of the selected candidate operator by digital processing.

13. The image processor as claimed in claim 11, wherein said display control means is adapted to do zooming, panning or tilting of the image of the selected candidate operator by controlling the image capturing device for capturing said mirrored video image feature.

14. The image processor as claimed in claim 7, wherein said object image generating means is adapted to generate multiple object images corresponding to the respective candidate operators, and said image combining means is adapted to combine said multiple object images and said mirrored video image feature in such a manner that the respective object images are displayed in a range that the image of the hand of the candidate operator can reach, for each image of the candidate operator.

15. The image processor as claimed in claim 14 further comprising means for selecting, when either one of the multiple object images are accessed, the image of the candidate operator corresponding to the object image, as the image of said operator, and display control means for zooming, panning or tilting the image of the selected candidate operator.

16. The image processor as claimed in claim 15, wherein said display control means is adapted to do zooming, panning or tilting of the image of the selected candidate operator by digital processing.

17. The image processor as claimed in claim 15, wherein said display control means is adapted to do zooming, panning or tilting of the image of the selected candidate operator by controlling the image capturing device for capturing said mirrored video image feature.

18. An image processing method comprising:
  receiving information of an object that is associated with a predetermined event,
  detecting position of an image of said operator included in a mirrored video image feature,
  generating a motion image map representing areas with high frequency and low frequency of motion of said operator by layering images of difference that represent differences in images between frames of said mirrored video image feature,
  determining an area where an object image of the object is to be generated based on a range and frequency of motion of the image of said operator as determined from the motion image map,
  producing a combined image that includes the image of the operator as a portion thereof and the object image, and
  providing the combined image on a predetermined display device, said combined image includes said object image and said mirrored video image feature in such a manner that said object image is displayed in a range that an image of a hand of said operator can reach, depending on the detected position of the image of said operator.

19. A computer readable recording medium having recorded thereon a computer program with which a computer to which a display device is connected is directed to:
  receive information regarding an object that is associated with a predetermined event, wherein the information facilitates generation of an image of the object;
  detect a position of an image of an operator included in a mirrored video image feature;
  generate a motion image map representing areas with high frequency and low frequency of motion of said operator by layering images of difference that represent differences in images between frames of said mirrored video image feature,
  determine an area where said object image is to be generated based on a range and frequency of motion of the image of said operator as determined from the motion image map,
  combine the object image and said mirrored video image feature in such a manner that said object image is displayed in a range that an image of a hand of said operator can reach, depending on the detected position of the image of said operator,
  display a combined image comprising the object image and the image of the operator by superimposing the object image on top of a mirrored video image feature that includes the image of the operator as a portion thereof.

20. A semiconductor device integrated in a device mounted on a computer to which a display device is connected, thereby with the semiconductor device, said computer is directed to form:
  object image generating means for generating an object image of an object that is associated with a predetermined event;
  image combining means for superimposing said object image on top of a mirrored video image feature that includes an image of an operator as a portion thereof to generate a combined image;
  display control means for providing production of the resulting combined image on said display device;

detection means for detecting the position of the image of said operator included in said mirrored video image feature;

motion image map generating means for generating a motion image map representing areas with high frequency and low frequency of motion of said operator by layering images of difference that represent differences in images between frames of said mirrored video image feature, said image combining means being adapted to determine an area where said object image is to be combined depending on a range and frequency of the motion of the image of said operator as determined from the motion image map; and said image combining means is directed to provide a function of combining said object image and said mirrored video image feature in such a manner that said object image is displayed in a range that an image of a hand of said operator can reach, depending on the position of the image of said operator detected by said detection means.

* * * * *